United States Patent [19]

Sugiyama

[11] Patent Number: 5,057,946

[45] Date of Patent: Oct. 15, 1991

[54] MAGNETIC DISK DRIVE APPARATUS

[75] Inventor: Tokuji Sugiyama, Kawasaki, Japan

[73] Assignee: Yamaha Corporation, Hamamatsu, Japan

[21] Appl. No.: 454,724

[22] Filed: Dec. 20, 1989

[30] Foreign Application Priority Data

Dec. 20, 1988 [JP] Japan .................. 63-321835

[51] Int. Cl.$^5$ .................................. G11B 5/09
[52] U.S. Cl. .......................... 360/46; 360/65
[58] Field of Search .................. 360/46, 67, 65

[56] References Cited

U.S. PATENT DOCUMENTS

| | | | |
|---|---|---|---|
| 4,346,411 | 8/1982 | Buhler et al. | 360/4 R |
| 4,399,474 | 8/1983 | Coleman, Jr. | 360/4 R |
| 4,506,305 | 3/1985 | Cardero | 360/4 R |
| 4,635,142 | 1/1987 | Haugland | 360/4 R |

FOREIGN PATENT DOCUMENTS 2119557A 4/1983 United Kingdom .

Primary Examiner—Vincent P. Canney
Attorney, Agent, or Firm—Spensley, Horn, Jubas & Lubitz

[57] ABSTRACT

The present invention relates to data reproduction systems for mechanical magnetic data storage equipment incorporating gate circuitry for the elimination of data errors caused by electrical inteference and the like, furthermore incorporating error detection and error correction circuitry. Means for measuring variation in the recording and playback characteristics of the magnetic media and heads, as well as means for correcting for such variation are proposed.

5 Claims, 2 Drawing Sheets

- 3 — MAGNETIC HEAD
- 4 — AMPLIFIER
- 5 — FILTER
- 6 — DIFFERENTIATION CIRCUIT
- 7 — GATE SIGNAL CIRCUIT
- 14 — PULSE CONVERTER CIRCUIT
- 15 — DECODER CIRCUIT
- 16 — CONTROLLER
- 17 — INTERFACE
- 18 — MICRO COMPUTER
- 19 — D/A CONVERTER

- 18a — MICRO COMPUTER
- 21 — ENVELOPE GENERATOR CIRCUIT
- 22 — A/D CONVERTER
- 23 — TIMING SIGNAL GENERATOR CIRCUIT

MAGNETIC DISK DRIVE APPARATUS

BACKGROUND OF THE INVENTION

1. Field of the Invention

The present invention relates to a magnetic disk drive apparatus. More specifically, the present invention relates to magnetic disk drive apparatus which provides an improved reliability in reading out data from magnetic disks.

2. Prior Art

In the past, magnetic disk drive apparatus have incorporated gate circuitry in order to eliminate data errors caused by electrical interference and the like. With such devices, the gate circuitry sets threshold values. Error bits having an amplitude lower than the preset threshold value are then eliminated.

There is inevitably a variation in the recording characteristics of the magnetic heads or media. The variation may result in a variation in the amplitude or other qualities of the read back data and makes it difficult to set appropriate threshold values. For example, if the threshold values are optimized for an area of the magnetic media where the read back signals are of a relatively low amplitude, then in regions where the read back signals are of a relatively high amplitude, error bits are likely to occur. Conversely, if the threshold values are optimized for an area of the magnetic media where the read back signals are of a relatively high amplitude, in regions where the read back signals are of low amplitude, loss of data is likely to occur. If an intermediate value is chosen, then both problems may occur.

SUMMARY OF THE INVENTION

In consideration of the above described difficulties, it is an object of the present invention to provide a magnetic disk drive apparatus in which the read data errors can be effectively diminished. It is a further object of the present invention to provide a magnetic disk drive apparatus and a method for reading data thereby incorporating gate circuitry in which the threshold values can be dynamically varied in order to correct for variation in the magnetic or other physical properties of the record/playback heads and magnetic media.

To accomplish these objectives, the present invention provides a gate signal generation means which processes signals read from the magnetic media, extracting signals greater than a certain threshold value thereby forming a gate signal; a read data generation means which generates read data based on the above mentioned gate signal and signals read from the magnetic media; and a threshold value setting means to appropriately control the above mentioned threshold value on the basis of the recording properties of the magnetic media.

BRIEF DESCRIPTION OF THE DRAWINGS

FIGS. 3A through D indicates wave forms from signals obtained at various points in the circuit shown in FIG. 1.

FIGS. 7A through D indicates wave forms from signals obtained at various points in the circuit shown in FIG. 4.

DETAILED DESCRIPTION OF THE PREFERRED EMBODIMENTS OF THE PRESENT INVENTION

In the following section the preferred embodiments of the present invention will be described with reference to the drawings.

Figure 1:
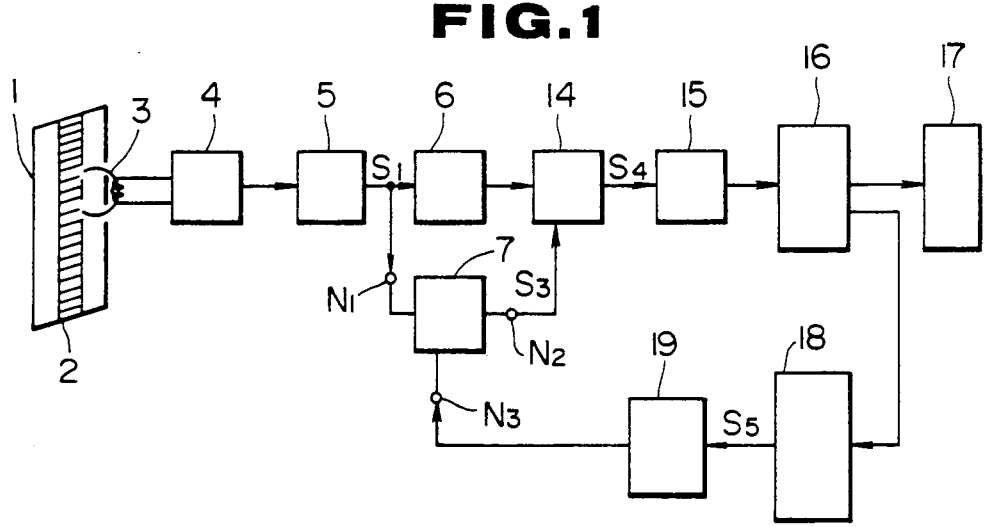
FIG. 1 is a block diagram showing the data reproduction system employed in the first embodiment of the present invention.

FIG. 1 is a block diagram showing a data reproduction system employed in a first embodiment of the present invention. In this drawing, data 2 is written on a magnetic disk 1. Magnetic head 3 reads the data 2. An amplifier 4, a filter 5 for the reduction of electric noise and similar extraneous signals, and a differentiation circuit 6 are connected in a series. A gate signal generator circuit 7 is then connected to the differentiation circuit 6.

Figure 2:
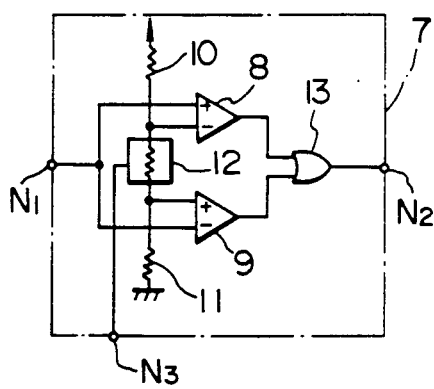
FIG. 2 is a schematic drawing of the gate signal generation circuit 7 indicated in FIG. 1.
Figure 3A:
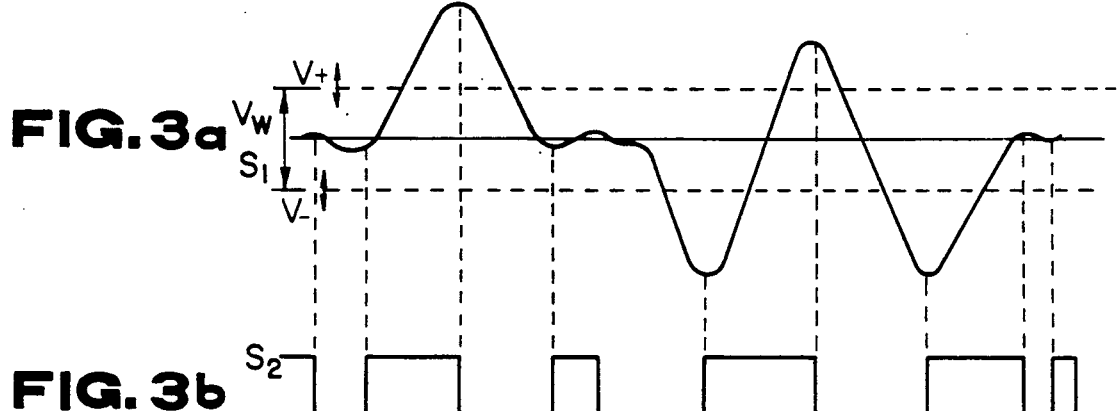
Figure 3A:
Figure 3A:
Figure 3A:

In the above mentioned gate signal generator circuit 7, the positive and negative components of an externally supplied signal are sliced into threshold values V+ and V- to form a gate signal. With this type of gate signal generator circuit 7, the threshold values V+ and V- can be varied by an externally supplied control signal. FIG. 2 is a schematic drawing of this type of gate signal generator circuit 7. In this drawing, the gate signal generator circuit 7 comprises a pair of comparators 7, 8. The non-inverted input of comparator 8 and the inverted input of comparator g are connected in common and with terminal N1. The inverted input of comparator 8 and the non-inverted input of comparator 9 are connected together via an intervening variable resistance 12. The connection of the inverted input of comparator 8 and the variable resistance 12 is also connected with a resistor 10, to the opposite end of which voltage is supplied by a power source. The connection of the non-inverted input of comparator 9 and the variable resistance 12 is also connected with a resistor 11, the opposite end of which is grounded. The outputs of comparators 8 and 9 are connected to first and second inputs, respectively, of logical adder 13. The output of logical adder 13 is connected with terminal N2. The control signal input of the above mentioned variable resistance 12 is connected with terminal N3. Variable resistance 12 may be formed using, for example, an FET (field effect transistor), so that its resistance varies depending on the externally supplied control signal.

In FIG. 1, numeral 14 indicates a pulse converter circuit. This pulse converter circuit 14 has a comparator (not shown in drawing) which generates a peak position signal (FIG. 3, graph b) which reverses polarity at the peak positions of the signal supplied from differentiation circuit 6 (when the slope of the wave form of the signal from differentiation circuit 6 (FIG. 3, graph a) changes from a positive value to a negative value, or vise versa). Based on this peak position signal output from the above mentioned comparator and the signal supplied from the above mentioned gate signal generator circuit 7, a read-data signal is generated.

Numeral 15 indicates a decoder circuit which receives the read-data signal output from pulse converter circuit 14 and converts that signal into an NRZ signal. Numeral 16 indicates a controller which receives the NRZ signal output from decoder circuit 15 and regenerates the data. This controller 16 includes conventional error detection circuitry for detecting errors in the regenerated data, for example, parity checking and checking for signals occurring out of phase. The controller also includes a function for outputting an error message when errors are detected in the regenerated data. Thus, when for example an excessive number of pulses or when pulses are detected out phase, an error message indicating that the threshold values are too low is generated. Similarly, parity errors occurring when no spurious peaks are judged to have occurred would indicate insufficient sensitivity, in other words, threshold values that are too high. Interface 17 carries out sending and receiving of data to and from the host equipment and the controller 16.

Numeral 18 indicates a microcomputer which includes (not shown) a CPU (central processing unit), ROM (read only memory), RAM (random access memory), as well as an interface. Written into the ROM is a control program by which means the CPU is controlled. Based on error messages received from controller 16, microcomputer 18 outputs data which causes the threshold values V+, V- generated by signal generator circuit 7 to vary. Numeral 19 indicates an D/A (digital-analog) converter.

In the following section, the operation of the above described data regeneration system will be described with reference to the FIGS. 1 and 3.

As data 2 is read out from magnetic disk 1 by magnetic head 3, the signal is amplified by amplifier 4 after which the signal is filtered by filter 5 by which means noise and other extraneous signals are removed. Then, the signal S1 (indicated by (a) in FIG. 3) output from filter 5 is supplied to both differentiation circuit 6 and gate signal generator signal 7. As the signal S1 is supplied to differential circuit 6, it is differentiated there and the differentiated signal is then output to pulse converter circuit 14. On the other hand, as the signal S1 is supplied to gate signal generator signal 7, the gate signal S3 (indicated by (c) in FIG. 3) is generated. The generated gate signal S3 is then output to pulse converter circuit 14.

Within the pulse converter circuit 14, the peak position signal S2 (FIG. 3, graph b) which reverses polarity at the peak positions of the signal S1 supplied from differentiation circuit 6 (FIG. 3, graph a) is generated, as described in the preceding section. Based on the timing of the inflections in this internal signal S2, the pulse converter circuit 14 carries out logical operations on signal S1 and gate signal S3 as will be described below.

In pulse converter circuit 14, when gate signal S3 is in a low state, no pulses are generated in the output of pulse converter circuit 14 in response to peak position signal S2. Conversely, when gate signal S3 is in a high state, the effect of peak position signal S2 is seen in the output wave form of pulse converter circuit 14. Due to this effect, the wave form of the read-data output (FIG. 3, graph d) of pulse converter circuit 14 shows no extraneous peaks, which are shown by dashed lines in FIG. 3, graph (d). Thus, gate signal S3 serves to filter spurious pulses from the output of pulse converter circuit 14.

The read-data of pulse converter circuit 14 is then output to decoder circuit 15 where it is transformed into a NRZ signal which is then output to controller 16. In controller 16, the data is then regenerated from the NRZ signal, after which the presence of absence of data errors is then judged. In the case where no error data is judged to be present, the data is sent from controller 16 to the host facilities via interface 17.

On the other hand, when it is determined that errors have occurred because the set threshold values V+, V- from gate signal generator circuit 7 are inappropriate, an error message is sent from the controller 16 to the microcomputer 18. Then, when microcomputer 18 receives the error message, based on the message, the microcomputer generates data S5 for the purpose of increasing or decreasing the threshold values V+, V- from gate signal generator circuit 7, this data being first sent to D/A converter 19 from which the converted analog signal is sent to terminal N3 of gate signal generator circuit 7. Through the above described actions, the threshold values V+, V- generated in gate signal generator circuit 7 are increased or decreased to appropriate values. Then, another attempt to read-out (read retry) the desired data from magnetic disk 1 and the above described sequence is repeated as necessary.

As described above, the threshold values V+, V- generated in gate signal generator circuit 7 can be adjusted based on the data output from controller 16, thereby permitting accurate data reproduction. Thus, variation in the magnetic or other physical characteristics of the magnetic heads, the magnetic disks, and other components which lead to variation in the recording characteristics and thus would otherwise lead to variation in the characteristics of the read back magnetic signals, may be suitably corrected for by use of the error message data as described above. Accordingly, the occurrence of error data can be diminished.

Figure 4:
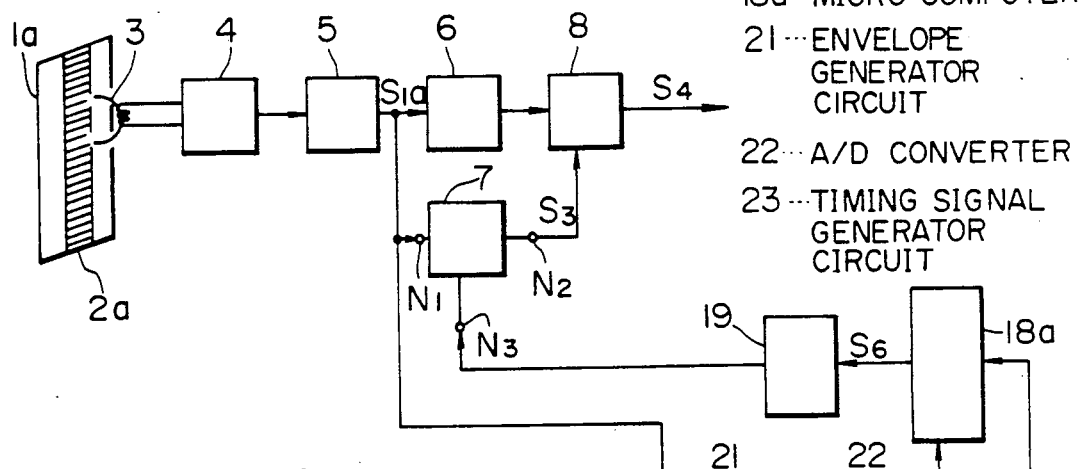
FIG. 4 is a block diagram showing the data reproduction system employed in the second embodiment of the present invention.

In the following section the preferred embodiments of a second preferred embodiment of the present invention will be described with reference to FIGS. 4–7. FIG. 4 is a block diagram showing the data reproduction system employed in the present embodiment of the present invention. In this drawing, those parts which are the same as in the first preferred embodiment shown in FIG. 1 will be labeled with the same numbers. Description of those elements will be appropriately abbreviated.

Figure 6:
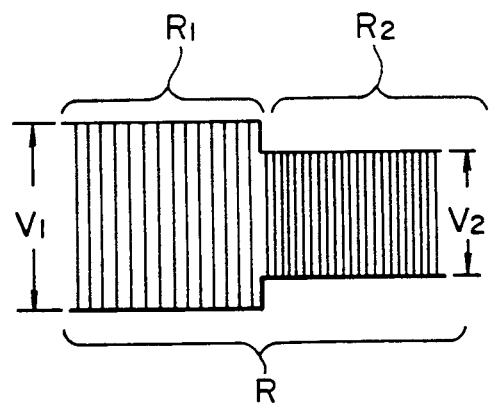
FIG. 6 is a magnified view of the gap region shown in FIG. 5 illustrating the individual components making up the gap region.
Figure 5:
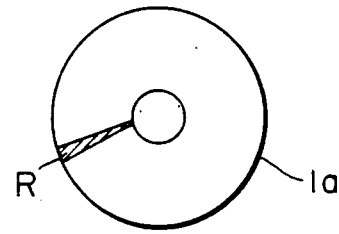
FIG. 5 is a schematic representation of a magnetic disk incorporating a gap region for the purpose of measuring the recording and play back characteristics of the magnetic signals.

In FIG. 4, numeral 1a indicates a magnetic disk which includes a gap region which is distinct from the regions in which ordinary data is read and written. As shown in FIG. 5, this gap region includes a characteristics measurement region R for the purpose of measuring the recording and play back characteristics of the magnetic signals. As shown in FIG. 6, this characteristics measurement region R is further subdivided to include a low frequency recording signal R1 and a high frequency recording signal R2 which are written to the disk. With the magnetic disk as thus described, when the data 2a is read out from the disk, included with the read out data is a characteristics measurement signal component made up of the above mentioned low frequency recording signal R1 and high frequency recording signal R2.

As in the case of the first preferred embodiment of the present invention, as data 2a is read out from magnetic disk 1a by magnetic head 3, the signal is amplified by amplifier 4 after which the signal is filtered by filter 5 by which means noise and other extraneous signals are removed. Then, the signal S1a (indicated by (a) in FIG. 7) output from filter 5 is supplied to differentiation circuit 6, gate signal generator signal 7, as well as to envelope generator circuit 21. The signal supplied to envelope generator circuit 21 is output as the peak voltages of the input signal.

The output of envelope generator circuit 21 is then supplied to A/D converter 22. Also sent to A/D converter 22 is a timing signal from timing signal generator circuit 23 which is generated on the basis of an index signal supplied from the disk drive mechanism. In FIG. 4, numeral 18a indicates a microcomputer which receives the output of A/D converter 22 as well as a timing signal from timing signal generator circuit 23. Based on the timing signal from timing signal generator circuit 23, microcomputer 18a carries out a prescribed processing on the digital signal supplied from A/D converter 22.

In the present preferred embodiment, the functions of differentiation circuit 6, gate signal generator signal 7, pulse converter circuit 14, decoder circuit 15, controller 16, and interface 17 are analogous to the function in the first preferred embodiment. Accordingly, discussion of these circuits will be abbreviated.

As mentioned above, the signal output from filter 5 is supplied to differentiation circuit 6, gate signal generator signal 7, as well as to envelope generator circuit 21. Within envelope generator circuit 21, the supplied signal is converted to peak voltages V1 corresponding with the low frequency recording signal R1. Based on the timing signal output from timing signal generator circuit 23, the peak voltages V1 are sent to A/D converter 22 where the signal is converted to a digital signal.

Immediately after the peak voltages V1 are generated, peak voltages V2 corresponding with the high frequency recording signal R2 are generated. As with the peak voltages V1, based on the timing signal output from timing signal generator circuit 23, the peak voltages V2 are sent to A/D converter 22 where the signal is converted to a digital signal. After the peak voltages V1 and V2 are converted to digital signals, they are successively sent to microcomputer 18a where the amplitude ratio V2/V1 is calculated from which the resolution is determined.

Figure 7A:
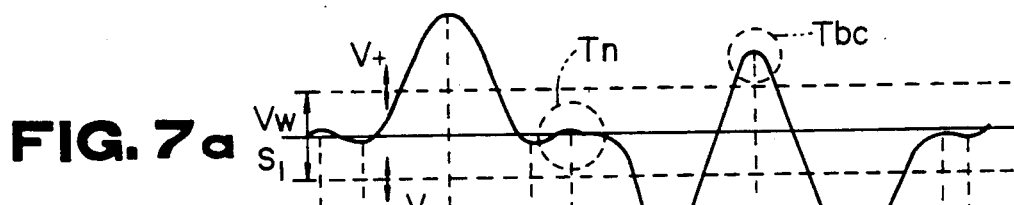
Figure 7A:
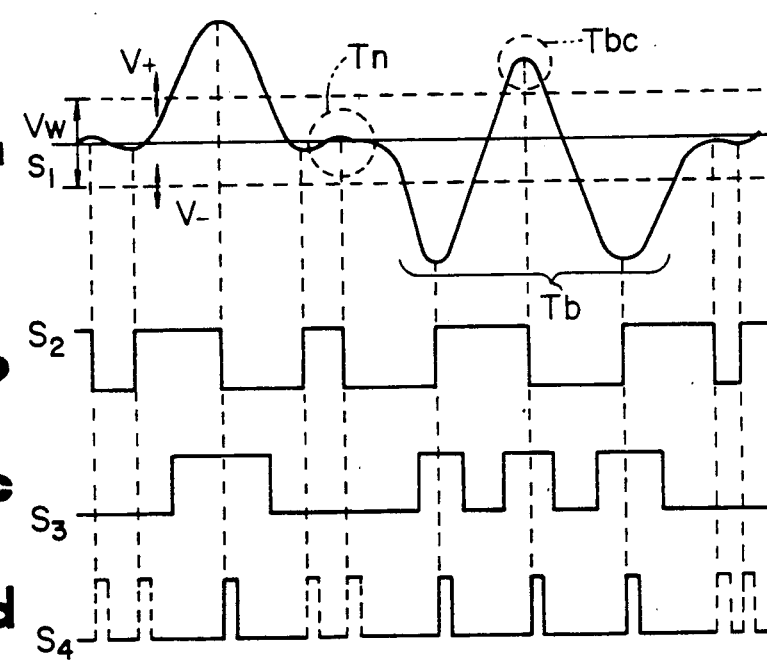

Based on the resolution, the microcomputer 18a generates a signal S6 which is then sent to D/A converter 19 from which the analog signal is sent to gate signal generator signal 7 where on the basis of that signal, the previously described threshold values V+, V- are appropriately increased or decreased. In the case where the resolution is high, the shoulder portion Th is FIG. 7(a) is exaggerated resulting in the easy generation of error bits. In such a case, the microcomputer 18a generates a signal S6 which causes the gate signal generator signal 7 to appropriately increase the threshold values V+, V-. Conversely, when the resolution is low, peak voltages such as peak Tbc in FIG. 7(a) become small and the loss of bits occurs easily. In this situation, the microcomputer 18a generates a signal S6 which causes the gate signal generator signal 7 to appropriately decrease the threshold values V+, V-.

Thus, the low frequency recording signal R1 and high frequency recording signal R2 previously written the characteristics measurement region R of the gap region on the magnetic disk 1a are read out by the magnetic head 3 and converted into corresponding peak voltages V1 and V2. From these peak voltages V1 and V2, the resolution is determined, and based on the resolution thus determined, the threshold values V+, V- are appropriately adjusted by which means the occurrence of error bits as well as lost bits can effectively be prevented. Accordingly, as with the first preferred embodiment, variation in the magnetic or other physical characteristics of the magnetic heads, the magnetic disks, and other components which lead to variation in the recording characteristics and would otherwise lead to variation in the characteristics of the read back magnetic signals, may be suitably corrected for by use of the error message data as described above. Thereby, the occurrence of error data can be diminished.

With the equipment and methods of the first and second preferred embodiments, parameters other than the threshold values may be adjusted in response to error data. Accordingly, the present invention is by no means limited to error reduction through the adjustment of threshold values. Similarly, in the second preferred embodiment, the characteristics measurement region R is incorporated in a gap region, but the invention is not so limited. For example, characteristics measurement data may be incorporated in the tracks where data is customarily written and read. Furthermore, in addition to magnetic media, the apparatus and method of the present invention may be applied to other forms of data storage and retrieval equipment including optical media related devices.

What is claimed is:

1. A magnetic disk drive apparatus for reading data recorded on a magnetic disk, the apparatus comprising:
   (a) at least one magnetic disk on which first reference data and second reference data are recorded together with ordinary data;
   (b) read-out means for reading the ordinary data, the first reference data and the second reference data on the magnetic disk;
   (c) threshold value setting means for setting and varying temporarily a dynamic threshold value based on a signal read out of the first reference data and a signal read out of the second reference data; and
   (d) read data generation means for generating read data based on a signal read out of the ordinary data, when the signal read out of the ordinary data exceeds the dynamic threshold value.

2. A magnetic disk drive apparatus in accordance with claim 1, wherein the dynamic threshold value is varied based on a peak level of the signal read out of the first reference data and a peak level of the signal read out of the second reference data.

3. A magnetic disk drive apparatus in accordance with claim 1, wherein the first reference data and the second reference data are stored in a characteristics measurement region provided on the magnetic disk, such that recording and reading characteristics of magnetic data are measured.

4. A magnetic disk drive apparatus in accordance with claim 1, wherein the signal read out of the first reference data is a high frequency signal, and wherein the signal read out of the second reference data is a low frequency signal:

5. A magnetic disk drive apparatus in accordance with claim 1, wherein the threshold value setting means sets and varies temporarily the dynamic threshold value based on the ratio of a peak level of the signal read out of the first reference data to a peak level of the signal read out of the second reference data.

* * * * *

UNITED STATES PATENT AND TRADEMARK OFFICE
CERTIFICATE OF CORRECTION

PATENT NO.    : 5,057,946
DATED         : October 15, 1991
INVENTOR(S) : Tokuji Sugiyama It is certified that error appears in the above-identified patent and that said Letters Patent is hereby corrected as shown below:

On the title page, Item
[73] Assignee:  Tokico Ltd.

Signed and Sealed this

Sixth Day of April, 1993

*Attest:*

STEPHEN G. KUNIN

*Attesting Officer*                    *Acting Commissioner of Patents and Trademarks*